May 2, 1944.  W. R. GOLDFINE  2,348,066
METHOD OF ROASTING COFFEE
Filed Jan. 2, 1941   3 Sheets-Sheet 3
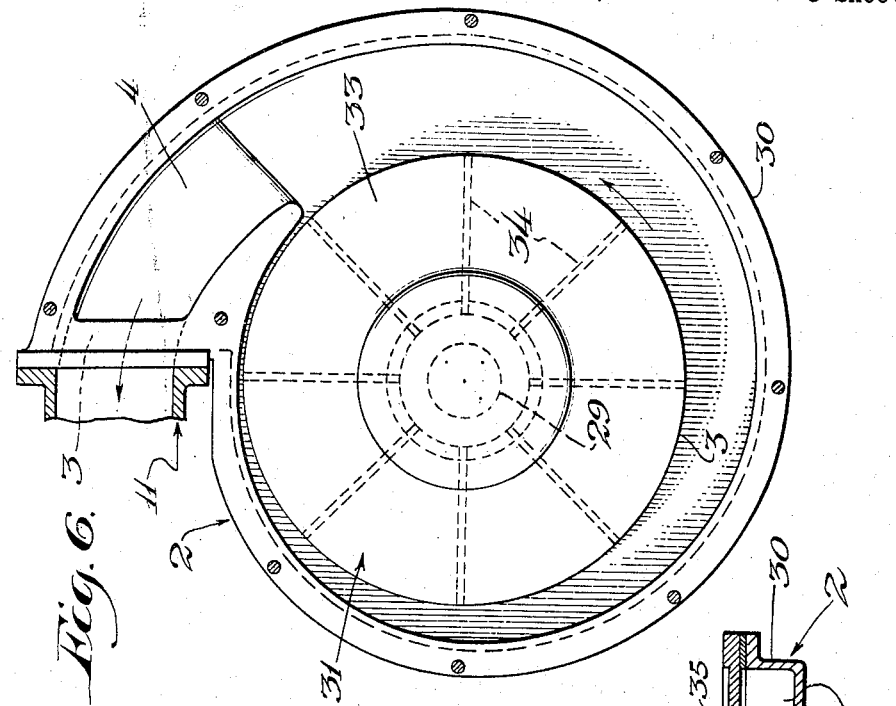
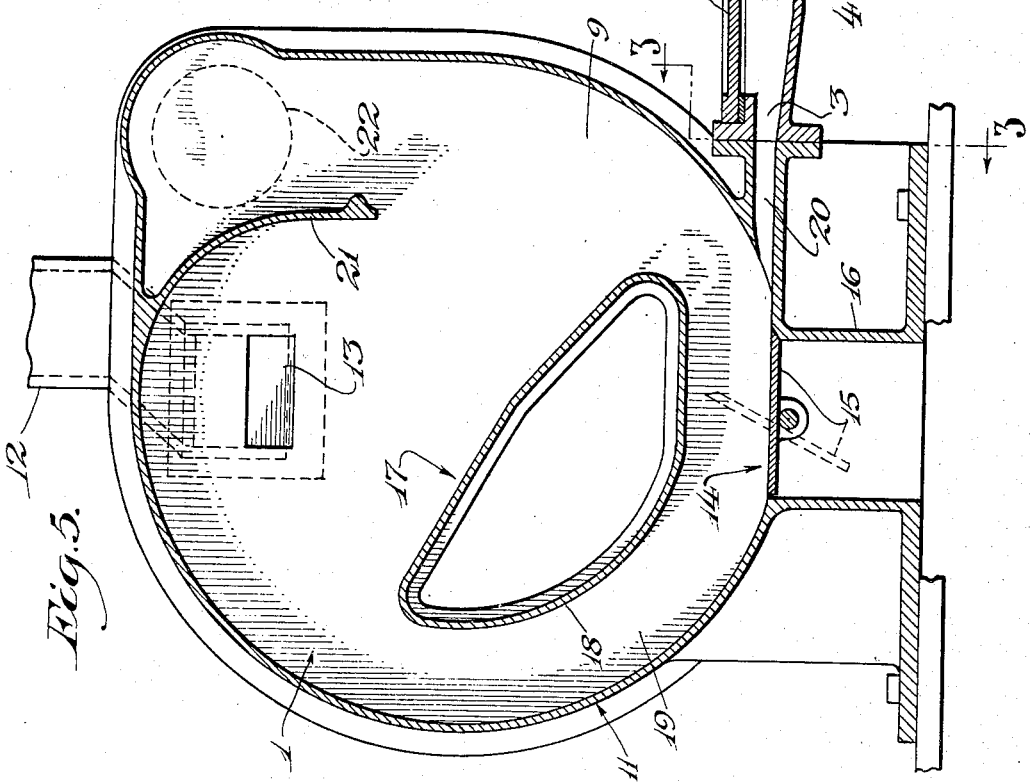
Inventor:
Wesley R. Goldfine
By Lee J. Gary
Attorney.

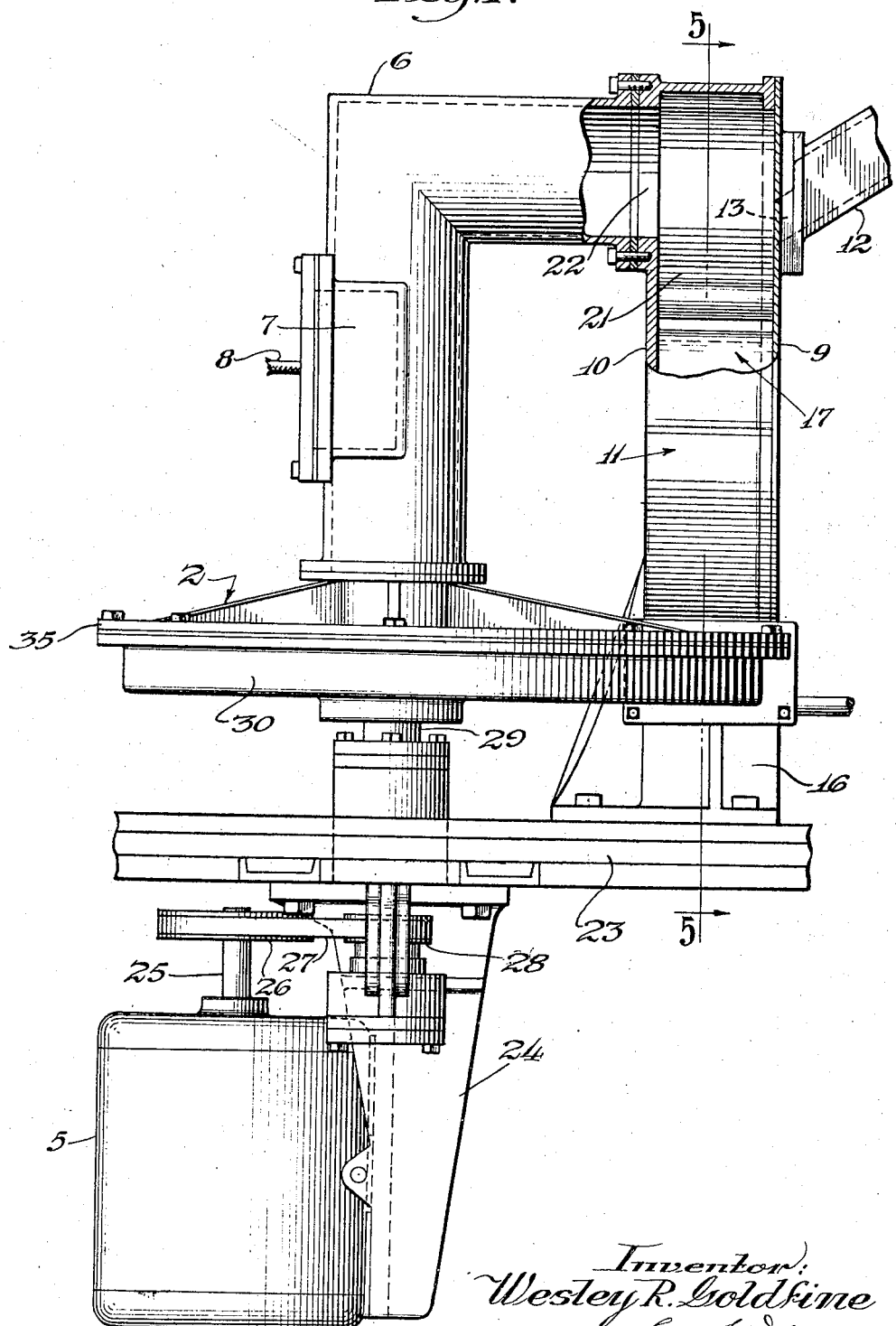

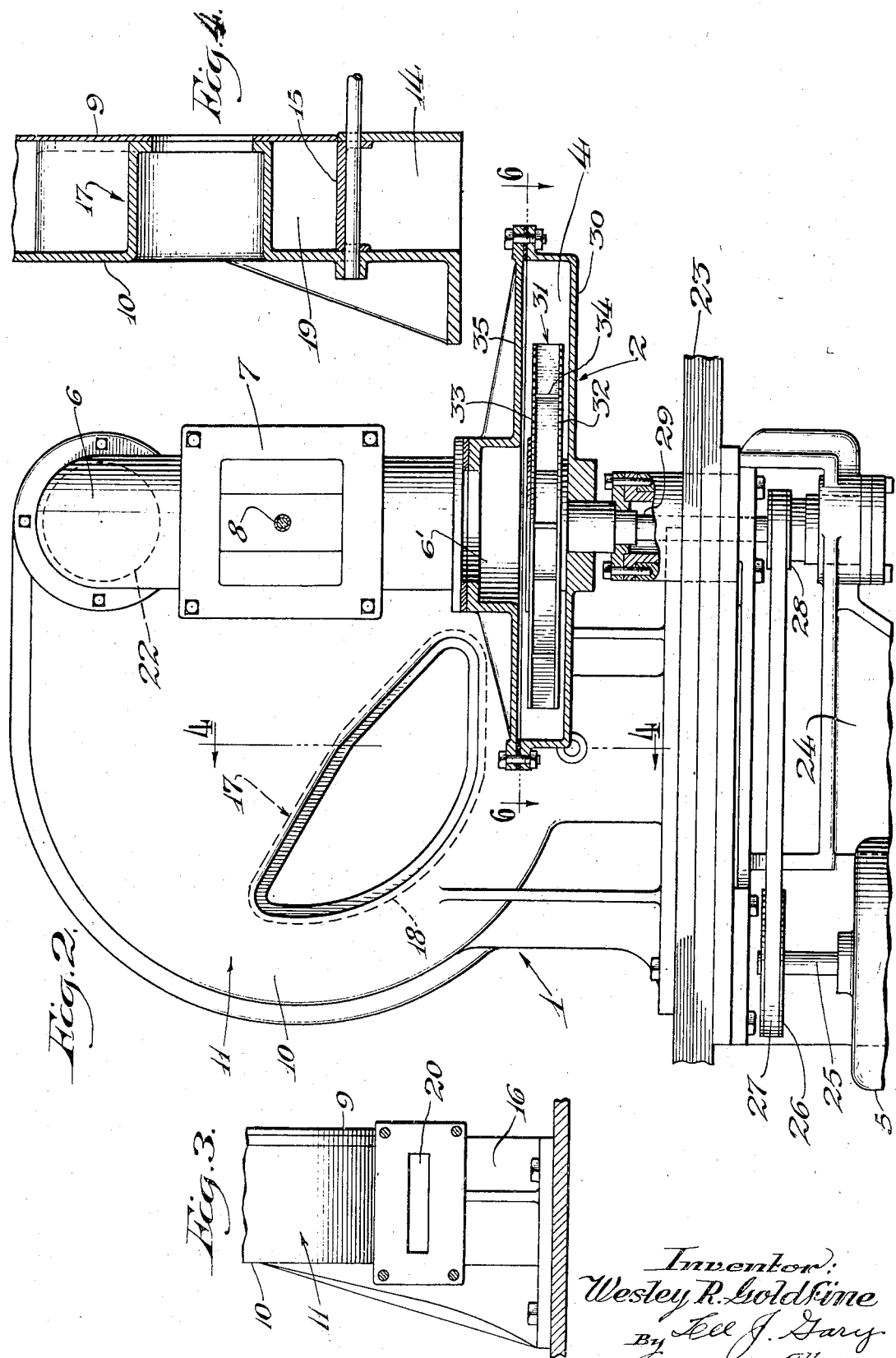

Patented May 2, 1944

2,348,066

UNITED STATES PATENT OFFICE 2,348,066

METHOD OF ROASTING COFFEE

Wesley R. Goldfine, Chicago, Ill., assignor to Airoast Corporation, Chicago, Ill., a corporation of Delaware Application January 2, 1941, Serial No. 372,710

6 Claims. (Cl. 99—68)

This invention relates to improvements in a process and apparatus for roasting coffee or the like and refers particularly to a process of roasting bean-like materials quickly and uniformly with a minimum expenditure of heat, and apparatus for carrying out the process.

One of the most troublesome factors encountered in roasting coffee or other bean-like materials resides in the difficulty of applying the heat to the beans in a uniform manner. Processes heretofore proposed are predisposed to cause local overheating or local over-roasting of the individual beans while other parts of the bean are underroasted. This is due in some measure to the fact that in most processes the beans come into contact with relatively hot surfaces and unless extreme care is exercised by an experienced operator "spotting" or local overroasting of the beans results. In other cases the heat interchange relationship of the individual beans and the source of heat is such that uniform roasting is substantially impossible.

In view of the delicate flavor characteristics of beans such as coffee a few spotted beans may serve to ruin the flavor of the entire roast. Under any circumstances non-uniformly roasted beans are not possessed of desired flavor characteristics and are not acceptable to the purchaser.

In the present invention, a method is provided whereby the beans to be roasted are physically carried by a relatively hot gas, usually heated air, moving at a comparatively high velocity, the roasting zone comprising a common portion of the path of travel of the beans and the gas, both of which, outside of said common path, travel in separate endless circuits or paths. The beans thus carried by the high velocity hot gases are continuously in motion during the roasting period, in an endless path, the gases being recirculated through an external circuit to replenish the heat lost to the beans during the roasting phase of the cycle.

It has heretofore been proposed, in the roasting of coffee, to pass a moving stream of hot air through a body of coffee beans to roast the latter, the air being circulated through an external heating phase to replenish the heat lost in the heating zone. The beans, however, have been confined in a cage or screened compartment through which the heated air passes, and do not pass through a cycle of movement of their own. The result is that the beans are insufficiently agitated to uniformly roast the same; the confining screen or cage quickly becomes clogged with hulls and chaff; and due to the density of the mass of the beans in the cage and the clogged screens, free circulation of the heated air is prevented resulting in local overroasting of a portion of the beans and insufficient roasting of other portions thereof, and necessitating the use of a blower of excessively high capacity and poor control of the air temperature.

In the present invention, all of the beans in the roast move at a speed substantially equal to that of the heated air; resistance to all movement of the air is materially reduced; and no screens are in position to be clogged, all of which results in uniform, efficient and quick roasting with the expenditure of the least amount of heat energy and power.

Other objects of the present invention will be apparent from the accompanying drawings and following detailed description.

In the drawings,

Fig. 1 is a side elevational view, parts being broken away and parts being shown in section, of the improved device for carrying out the present process.

Fig. 2 is a rear elevational view, parts being shown in section, of the device illustrated in Fig. 1.

Fig. 3 is a sectional view taken on the line 3—3 of Fig. 5, illustrating the air inlet to the roasting chamber.

Fig. 4 taken on line 4—4 of Fig. 2.

Fig. 5 is a sectional view taken on line 5—5 of Fig. 1, illustrating the interior of the roasting chamber.

Fig. 6 is a sectional view taken on the line 6—6 of Fig. 2.

Referring in detail to the drawings, I indicates a roasting chamber for coffee beans or other bean-like material. The outlet 3 of a blower 2 connects into chamber I by means of a conduit 4 whereby air or other gas may be discharged at relatively high velocity into the roasting chamber. The blower 2 is driven by motor 5 or other suitable prime mover. A conduit 6 connects the roasting chamber to the inlet 6' of blower 2, an electric heating unit 7, having electric connections 8, being positioned in said conduit to heat the air or gas passing from the chamber I to the blower 2.

The chamber I is provided with front and rear walls 9 and 10, respectively, the lateral or connecting walls 11 being curvilinear in contour. Of course, it is not essential that the outer surfaces of the walls 11 be curvilinear since no function is accomplished thereby, but the inner contour must be curvilinear to provide the desired path for the passage of the beans and hot gases through the roasting zone, as will be hereinafter more fully described.

A conduit 12 is mounted upon the front wall 9, the interior of said conduit connecting into the upper portion of the roasting compartment through opening 13 provided in the wall 9. The upper portion of the conduit 12 may be connected with a closed hopper (not shown) whereby coffee beans or other bean-like material may be charged to the roasting chamber. A discharge opening 14 is provided in the wall 11 at the bottom of the roasting chamber, said opening being controlled by butterfly valve 15 whereby the roasted beans may be removed from the roasting chamber. A discharge conduit 16 directs the discharging beans to a hopper, bag or the like (not shown). During the roasting operation the valve 15 is swung to closed position.

The interior of the compartment 1 is divided by a baffle 17 which extends from wall 9 to wall 10. One side of the baffle 17 is curved, as at 18 to conform with the contour of the inner surface of wall 11. Thus a zone or compartment 19 is provided which extends from the inlet 4 to the upper end of the curved portion of the baffle 17. The gas inlet to the compartment comprises a substantially rectangular opening 20 which causes the air or gas discharged from the blower 2 to enter the roasting zone along a tangent to the curved wall 11. The zone 19 is of comparatively restricted cross-sectional area and said area is substantially uniform up to the upper end of the baffle 17 whereby the air discharged through the opening 20 travels through the zone 19 at a relatively high, substantially constant velocity.

The beans which have been deposited through the opening 13 utlimately find their way to a position in front of the opening 20 and when the hot air or gases are passed into the roasting zone said beans are bodily carried by the high velocity stream through the curved compartment 19. During this phase of the roasting period the beans are actually floating upon the rapidly moving gas stream and the individual beans are entirely surrounded by the hot gases and are hence uniformly roasted on all sides simultaneously. In view of the fact that the beans move rapidly through the zone 19, they never contact any solid surface for sufficient length of time to permit local overroasting or spotting. As a further advantage, the beans being "washed" by the rapidly moving current of air have the "corona" of gas or air, which normally surrounds each bean, removed. This permits more efficient heating of the beans since said corona layer normally serves as an insulating medium upon the surface of the bean against the heating of the bean by convection heat.

As the beans, carried by the rapidly moving air stream pass the upper end of the baffle 17, the roasting chamber widens out thereby reducing the velocity of travel of the air to such an extent as to permit gravity to pull the beans downwardly. The beans thus left in an unsupported manner fall to the bottom of the roasting compartment where they are again caught by the incoming stream of hot air and the cycle is repeated.

A second baffle 21 extends from the upper portion of the wall 11 and is so curved as to direct the beans projected from the zone 19 in a downwardly direction toward the gas inlet opening 20. The baffle 21, in addition functions in a manner similar to a jetty causing a diminution in the velocity of the traveling air and permitting said air to swirl or eddy around the back of the baffle while dropping the beans from entrainment. A gas discharge opening 22 is provided behind the baffle 21 whereby the air is drawn into the conduit 6 wherein its lost heat is replenished prior to again returning to the roasting compartment.

In practice it has been found that there are essentially two air streams circulating in the roasting chamber. The first air stream comprises that air which enters the chamber through the opening 20. It is this stream which primarily carries the beans through the chamber, the bulk of the stream traversing the outer defining periphery of the chamber. A portion of this stream, after expansion takes place in the chamber, leaves the chamber through the exit 22. Another portion of this stream, after expansion takes place in the chamber, is induced, by the injector action of the main stream entering the chamber through the opening 20, downwardly toward said opening and is recirculated in a substantially parallel relationship with the stream entering the chamber through the opening 20. However, the induced stream follows the contour of the baffle 17.

The induced stream is helpful in the process in that it serves as a cushion when the beans, at the upper portion of their travel in the chamber, fall from the stream carrying them. This fact permits relatively high air velocities to be used without serious danger of breaking or cracking the beans by impact with any solid surface.

Because of the rapid and efficient heat interchange between the beans and the circulating air, lower roasting temperatures can be employed than have heretofore been possible. For example, 18½ ounces of green coffee were roasted at 470° F., in a period of 3 minutes. During the roasting operation 190 cubic feet of heated air was in circulation in the roasting chamber and it was found that the entire mass of beans circulated 3600 times per minute around the baffle 17. The efficiency and uniformity of heat interchange can be judged by the rate at which it is possible to circulate the beans in the roasting chamber. In addition, it has been estimated that there is an average of about three revolutions of each bean about its own axis for each cycle through the roasting chamber.

Of course, the present invention is not to be limited by the above example, since it is merely set forth for purposes of illustration.

It has been found, however, that in the present process, roasting temperatures for coffee ranging between about 430 and 475° F. are suitable. Of course, the quantity of heated air introduced per unit of time, the velocity of the air delivered by the blower, or the quantity of air in circulation in the roasting chamber at any predetermined time, will depend largely upon the number of beans, that is, the amount of bean-like material to be kept in circulation and the size of the unit. For a roasting unit of predetermined size, uniform roasting is difficult of attainment at below about 40 per cent of its rated or maximum capacity. For example, for a unit of 18½ ounces capacity, satisfactory uniform roasting can be obtained when more than about 8 ounces of coffee is being roasted. Below about 8 ounces uniform roasting is difficult of attainment.

The lower velocity limit, in general, is that velocity or that quantity of air which is in circulation at a predetermined time which will maintain all of the beans in circulation, and the upper limit of velocity will be determined principally upon considerations of breaking or cracking the beans when higher velocities are employed. In addition, excessive air velocities are likely to cause some of the beans to leave the chamber through the exit 22, which, of course, is undesirable.

As an example of the velocity or air circulation relation to the quantity of bean-like materials; in a unit having a capacity of 18½ ounces of green coffee, for full capacity or 18½ ounces a total air circulation of 190 cubic feet has been found satisfactory. For about 16 ounces, about 160 cubic feet. For about 12 ounces, about 127 cubic feet. For about 8 ounces, about 100 cubic feet. A variation of about 2½ or 3 per cent can be employed, above or below the quantity of air in circulation, as hereinbefore described, for a predetermined weight of coffee without encountering difficulties. In general, as the capacity of the unit increases, the quantity of air in circulation or air velocity for a predetermined weight of coffee increases.

The apparatus comprising the present invention is shown in its essential form and obvious associated equipment such as insulation surrounding the compartments and conduits through which the hot gases are circulated is contemplated. Of course, the size of the motor and blower must be such, depending upon the size of the roasting compartment, conduits, etc., and the individual and total weight of the bean to be roasted, that the beans can be carried in entertainment in the zone 19. In addition, the heat capacity of the heating unit 7 will, of course, depend upon the velocity and total volume of air to be heated and the rate at which it is desired to carry out the roasting operation.

The roasting machine may be constructed as a unit, having a main supporting frame 23 upon which the roasting chamber 1 may be mounted. An auxiliary frame 24 may be carried by frame 23 and may, in turn, support the motor 5. Shaft 25 of motor 5 carries a pulley 26 over which a belt 27 travels, said belt also being trained around pulley 28, which in turn, is carried by shaft 29 of blower 2. The blower 1 comprises a housing 30 within which a rotor 31 is eccentrically positioned, the rotor comprising a pair of spaced discs 32 and 33, interposed between which are a plurality of angularly spaced radial vanes 34. A closure 35 is provided for the housing 30 which may be removably secured to the housing.

I claim as my invention:

1. A method of roasting coffee beans or similar bean-like materials which comprises, passing a relatively hot gas into a closed zone containing the beans to be roasted, at sufficiently high velocity to carry said beans in entrainment in said moving gas, moving said beans in an endless path in said zone, separating a portion of said hot gas and said beans at a portion of said endless path, causing said separated beans to fall downwardly in speed relation to said entrained beans, and removing said separated gas from said zone.

2. A method of roasting coffee beans or similar bean-like materials which comprises, passing a relatively hot gas into a closed zone containing the beans to be roasted, at sufficiently high velocity to carry said beans in entrainment in said moving gas, moving said beans in a defined curvilinear endless path in said zone, separating a portion of said hot gas and said beans at a portion of said endless path, removing said separated gas from said zone, reheating said gas in a spaced heating zone and returning the same to said closed zone.

3. A method of roasting coffee beans or similar bean-like materials which comprises, passing a relatively hot gas into a closed zone comprising an endless confined arcuate pasageway containing the beans to be roasted, said hot gas being introduced in a tangential direction and traveling at sufficiently high velocity during a portion of its travel through said confined passageway to carry said beans in entrainment, reducing said gas velocity at another portion of said confined passageway a sufficient degree to cause said beans to drop out of said gas in spaced relation to the entrained beans to separate a portion of said gas and beans, and returning said beans to their starting point in said confined passageway.

4. A method of roasting coffee beans or similar bean-like materials which comprises, passing a relatively hot gas into a closed zone comprising an endless confined passageway containing the beans to be roasted, said hot gas traveling at sufficiently high velocity during a portion of its travel through said confined passageway to carry said beans in entrainment in an upwardly moving stream and in an arcuate path, reducing said gas velocity at another portion of said confined passageway a sufficient degree to cause said beans to drop out of said gas in spaced relation to said upwardly moving stream to separate a portion of said gas and beans, returning said beans to their starting point in said confined passageway, and repeating the cycle until the beans are roasted.

5. A method of roasting coffee beans or similar bean-like materials which comprises, passing a relatively hot gas in a tangential direction into an arcuate portion of a closed zone comprising an endless confined passageway containing the beans to be roasted, said hot gas traveling at sufficiently high velocity during a portion of its travel through said confined passageway to carry said beans in entrainment in a curvilinear path, reducing said gas velocity at another portion of said confined passageway a sufficient degree to cause said beans to drop out of said gas in spaced relation to said entrained beans to separate a portion of said gas and beans, returning said beans to their starting point in said confined passageway, removing said separated gas from said closed zone, reheating the same in a separate zone out of contact with the aforesaid zone, and returning the reheated gas to confined passageway to repeat the cycle therein.

6. A method of roasting coffee beans or other bean-like materials which comprises, introducing in a tangential direction a relatively hot gas into a lower portion of a closed arcuate zone, comprising an endless confined passageway containing the beans to be roasted, at sufficiently high velocity to lift said beans in said passageway and carry the same upwardly in entrainment, reducing said gas velocity at an upper portion of said pasageway to cause said beans to drop out of entrainment and causing them to fall in spaced relationship to the upwardly moving beans to the lower portion of said passageway adjacent the point of introduction of said gas, and removing a portion of the gas from said passageway after the beans have dropped out of entrainment.

WESLEY R. GOLDFINE.